(12) United States Patent
Kitami

(10) Patent No.: US 8,418,334 B2
(45) Date of Patent: Apr. 16, 2013

(54) METHOD OF CHANGING DAMPING CHARACTERISTICS OF TWIN-TUBE SHOCK ABSORBER

(76) Inventor: Takahiro Kitami, Chiba (JP)

( * ) Notice: Subject to any disclaimer, the term of this patent is extended or adjusted under 35 U.S.C. 154(b) by 936 days.

(21) Appl. No.: 12/524,278

(22) PCT Filed: Dec. 28, 2007

(86) PCT No.: PCT/JP2007/001496
§ 371 (c)(1),
(2), (4) Date: Jul. 23, 2009

(87) PCT Pub. No.: WO2008/090591
PCT Pub. Date: Jul. 31, 2008

(65) Prior Publication Data
US 2010/0024184 A1 Feb. 4, 2010

(30) Foreign Application Priority Data
Jan. 25, 2007 (JP) ................... 2007-014947

(51) Int. Cl.
*B21K 21/16* (2006.01)
*B23P 17/04* (2006.01)
*B23P 23/00* (2006.01)

(52) U.S. Cl.
USPC .......... 29/401.1; 29/402.01; 188/297

(58) Field of Classification Search ............ 29/401.1, 29/402.01, 402.03, 402.18, 426.1, 213.1; 188/297, 301, 313, 314, 322.19, 322.2, 322.21; 280/5.5
See application file for complete search history.

(56) References Cited

U.S. PATENT DOCUMENTS

| 4,261,446 | A | * | 4/1981 | Bolger ..................... 188/322.19 |
| 4,567,637 | A | * | 2/1986 | Pees et al. ................... 29/402.08 |
| 5,152,547 | A | * | 10/1992 | Davis ........................ 280/5.512 |

(Continued)

FOREIGN PATENT DOCUMENTS

| JP | 55-117639 U | 2/1980 |
| JP | 1-169633 U | 11/1989 |
| JP | 2006-029386 A | 2/2006 |

OTHER PUBLICATIONS

Notification of Reason for Refusal dated Nov. 13, 2007 (mailing date), issued in corresponding Japanese Patent Application No. 2007-014947.

(Continued)

*Primary Examiner* — David Bryant
*Assistant Examiner* — Christopher Koehler
(74) *Attorney, Agent, or Firm* — Westerman, Hattori, Daniels & Adrian, LLP

(57) ABSTRACT

The present invention provides a method of optionally changing damping characteristics of a twin-tube shock absorber.
In the method of changing the damping characteristics of the twin-tube shock absorber (10), a threaded hole (11a) is formed in an outer tube (11), oil is drained from the inside of the twin-tube shock absorber (10) through the threaded hole (11a), replacement oil (35) is charged into the twin-tube shock absorber (10), and a check valve (20) is mounted in the threaded hole (11a). Thereafter, in a state that the check valve (20) is positioned on the upper side in the twin-tube shock absorber (10), a gas is sucked out from the inside of the twin-tube shock absorber (10) through a flow channel of the temporarily opened check valve (20), and a replacement nitrogen gas (36) is injected into the twin-tube shock absorber (10).

7 Claims, 15 Drawing Sheets

U.S. PATENT DOCUMENTS

| | | | | |
|---|---|---|---|---|
| 5,335,757 A * | 8/1994 | Knecht et al. | | 188/297 |
| 6,026,939 A * | 2/2000 | Girvin et al. | | 188/266.7 |
| 6,119,829 A * | 9/2000 | Nakadate | | 188/266.6 |
| 7,766,136 B2 * | 8/2010 | Runkel | | 188/297 |
| 2006/0027954 A1 * | 2/2006 | Nesbitt et al. | | 267/64.11 |

OTHER PUBLICATIONS

International Search Report of PCT/JP2007/001496, Mailing Date of Apr. 15, 2008.

* cited by examiner

METHOD OF CHANGING DAMPING CHARACTERISTICS OF TWIN-TUBE SHOCK ABSORBER

TECHNICAL FIELD

The present invention relates to a method of changing damping characteristics of a twin-tube shock absorber mounted in, for example, automobiles and motorcycles.

BACKGROUND ART

Conventionally, there has been known a twin-tube shock absorber mounted in, for example, automobiles and motorcycles (for example, see Patent Document 1).
Patent Document 1: Japanese Patent Application Laid-Open No. 2006-29386

DISCLOSURE OF THE INVENTION

Problem to be Solved by the Invention

In a conventional twin-tube shock absorber, when the damping characteristics do not satisfy the conditions of use, there is such a problem that the twin-tube shock absorber itself should be replaced.

Thus, an object of the present invention is to provide a method of optionally changing the damping characteristics of the twin-tube shock absorber.

Means for Solving the Problem

A method of changing damping characteristics of a twin-tube shock absorber of the present invention, includes: a hole formation step of forming a hole in an outer tube of the twin-tube shock absorber; an oil draining step of draining oil from the inside of the twin-tube shock absorber to the outside through the hole, the oil draining step being performed after the hole formation step; an outflow prevention valve mounting step of mounting in the hole an outflow prevention valve for preventing a fluid from outflowing from the inside of the twin-tube shock absorber to the outside through the hole, the outflow prevention valve mounting step being performed after the hole formation step; a replacement oil charge step of charging replacement oil from the outside of the twin-tube shock absorber to the inside through the hole, the replacement oil charge step being performed after the oil draining step; a gas sucking step of sucking a gas from the inside of the twin-tube shock absorber to the outside through a flow channel of the temporarily opened outflow prevention valve in a state that the outflow prevention valve is positioned on the upper side in the twin-tube shock absorber, the gas sucking step being performed after the replacement oil charge step and the outflow prevention valve mounting step; and a replacement gas injection step of injecting a replacement gas from the outside of the twin-tube shock absorber to the inside through the flow channel of the temporarily opened outflow prevention valve in a state that the outflow prevention valve is positioned on the upper side in the twin-tube shock absorber, the replacement gas injection step being performed after the gas sucking step.

According to the method of changing the damping characteristics of a twin-tube shock absorber of the present invention, by adjusting at least one of the kind of the replacement oil charged from the outside of the twin-tube shock absorber to the inside, the amount of the replacement oil, the kind of the replacement gas injected from the outside of the twin-tube shock absorber to the inside, and the amount of the replacement gas, the damping characteristics of the twin-tube shock absorber can be changed to the desired damping characteristics.

Further, the oil draining step of the method of changing the damping characteristics of a twin-tube shock absorber of the present invention preferably includes: a compressed gas injection step of injecting a compressed gas from the outside of the twin-tube shock absorber to the inside through the hole; and a piston rod position upper side state compressed gas discharge step of discharging the compressed gas from the inside of the twin-tube shock absorber to the outside through the hole in a state that the piston rod is positioned on the upper side in the twin-tube shock absorber, the piston rod position upper side state compressed gas discharge step being performed after the compressed gas injection step.

According to the method of changing the damping characteristics of a twin-tube shock absorber of the present invention, since an atmospheric pressure between the outer tube and the inner tube is reduced by discharging the compressed gas from the inside of the twin-tube shock absorber to the outside through the hole of the outer tube, the oil remaining in the inner tube can be sucked from the inside of the inner tube to the outside through a base valve of the bottom portion of the inner tube.

Further, the oil draining step of the method of changing the damping characteristics of a twin-tube shock absorber of the present invention preferably includes a rod position upper side state fluid sucking step of sucking the fluid from the inside of the twin-tube shock absorber to the outside through the hole in a state that the piston rod is positioned on the upper side in the twin-tube shock absorber.

According to the method of changing the damping characteristics of a twin-tube shock absorber of the present invention, since the atmospheric pressure between the outer tube and the inner tube is reduced by sucking the fluid from the inside of the twin-tube shock absorber to the outside through the hole of the outer tube, the oil remaining in the inner tube can be sucked from the inside of the inner tube to the outside through the base valve of the bottom portion of the inner tube.

Further, the oil draining step of the method of changing the damping characteristics of a twin-tube shock absorber of the present invention preferably includes a hole position lower side state fluid sucking step of sucking the fluid from the inside of the twin-tube shock absorber to the outside through the hole in a state that the hole is positioned on the lower side in the twin-tube shock absorber.

According to the method of changing the damping characteristics of a twin-tube shock absorber of the present invention, since the fluid is sucked from the inside of the twin-tube shock absorber to the outside through the hole in a state that the hole is positioned on the lower side in the twin-tube shock absorber, the oil remaining in the outer tube can be sucked from the inside of the outer tube to the outside.

Further, the oil draining step of the method of changing the damping characteristics of a twin-tube shock absorber of the present invention preferably includes: a compressed gas injection step of injecting a compressed gas from the outside of the twin-tube shock absorber to the inside through the hole; and a hole position lower side state compressed gas discharge step of discharging the compressed gas from the inside of the twin-tube shock absorber to the outside through the hole in a state that the hole is positioned on the lower side in the twin-tube shock absorber, the hole position lower side state compressed gas discharge step being performed after the compressed gas injection step.

According to the method of changing the damping characteristics of a twin-tube shock absorber of the present invention, since the compressed gas is discharged from the inside of the twin-tube shock absorber to the outside through the hole in a state that the hole is positioned on the lower side in the twin-tube shock absorber, the oil remaining in the outer tube and the compressed gas in the outer tube can be simultaneously discharged from the inside of the outer tube to the outside.

Further, the method of changing the damping characteristics of a twin-tube shock absorber of the present invention preferably includes a drained oil measurement step of measuring the amount of the oil drained from the inside of the twin-tube shock absorber to the outside in the oil draining step, wherein the amount of the replacement oil charged from the outside of the twin-tube shock absorber to the inside in the replacement oil charge step is determined based on the amount of the oil measured in the drained oil measurement step.

According to the method of changing the damping characteristics of a twin-tube shock absorber of the present invention, since the amount of the replacement oil is determined based on the oil originally contained in the twin-tube shock absorber, the damping characteristics of the twin-tube shock absorber can be easily changed to the desired damping characteristics.

Further, in the method of changing the damping characteristics of a twin-tube shock absorber of the present invention, the replacement oil preferably contains a rubber softener.

According to the method of changing the damping characteristics of a twin-tube shock absorber of the present invention, the replacement oil can be prevented from leaking from the inside of the twin-tube shock absorber to the outside through a rubber seal of the twin-tube shock absorber.

Effect of the Invention

According to the present invention, a method of optionally changing the damping characteristics of the twin-tube shock absorber can be provided.

DESCRIPTION OF REFERENCE NUMERALS

Figure 1:
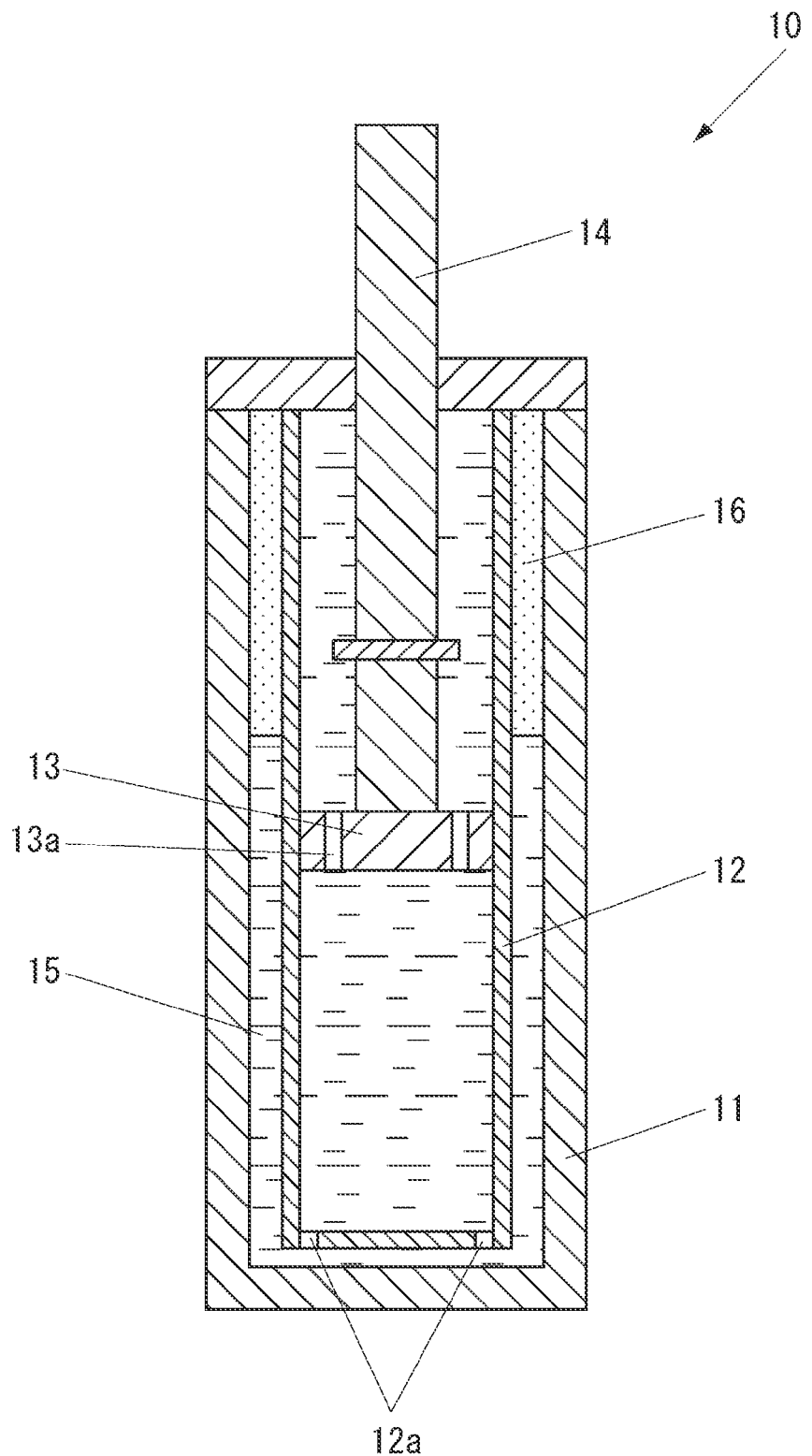
FIG. 1 is a cross-sectional view of a twin-tube shock absorber before applying a method of changing the damping characteristics of a twin-tube shock absorber according to one embodiment of the present invention.

10 Twin-tube shock absorber
11 Outer tube
11a Threaded hole (hole)
15 Oil
16 Gas
17 Air (gas)
20 Check valve (outflow prevention valve)
20a Flow channel
35 Oil (replacement oil)
36 Nitrogen gas (replacement gas)

BEST MODE FOR CARRYING OUT THE INVENTION

Hereinafter, one embodiment of the present invention will be described referring to the drawings.

First, there is described a configuration of a twin-tube shock absorber before applying a method of changing the damping characteristics of a twin-tube shock absorber (hereinafter referred to as "a damping characteristics changing method") according to the embodiment.

FIG. 1 is a cross-sectional view of a twin-tube shock absorber 10 before applying the damping characteristics changing method according to the embodiment.

As shown in FIG. 1, the twin-tube shock absorber 10 includes an outer tube 11, an inner tube 12 disposed inside the outer tube 11, a piston 13 disposed inside the inner tube 12, a piston rod 14 integrated with the piston 13, oil 15 contained between the outer tube 11 and the inner tube 12 or inside the inner tube 12, and a gas 16 contained between the outer tube 11 and the inner tube 12.

The inner tube 12 includes a base valve 12a provided on the bottom portion. The piston 13 includes a piston valve 13a.

Next, the damping characteristics changing method according to the embodiment will be described.

According to the damping characteristics changing method of the embodiment, the following steps are successively performed: a hole formation step of forming a threaded hole 11a (see, FIG. 2) in the outer tube 11 of the twin-tube shock absorber 10; an oil draining step of draining the oil 15 from the inside of the twin-tube shock absorber 10 to the outside; a valve case mounting step of mounting only a valve case 21 (see, FIG. 3) of a check valve 20 (see, FIG. 3) in the threaded hole 11*a*; a replacement oil charge step of charging replacement oil 35 (see, FIG. 3) from the outside of the twin-tube shock absorber 10 to the inside; a check valve mounting step (outflow prevention valve mounting step) of mounting the check valve 20 in the threaded hole 11*a*; a gas sucking step of sucking an air 17 (see, FIG. 4) as a gas from the inside of the twin-tube shock absorber 10 to the outside; a replacement gas injection step of injecting a nitrogen gas 36 (see, FIG. 3) as a replacement gas from the outside of the twin-tube shock absorber 10 to the inside; and a completion inspection step of inspecting whether the twin-tube shock absorber 10 to which the damping characteristics changing method according to the embodiment is applied is completed. Hereinafter, each step will be described.

<Hole Formation Step>

Figure 2:
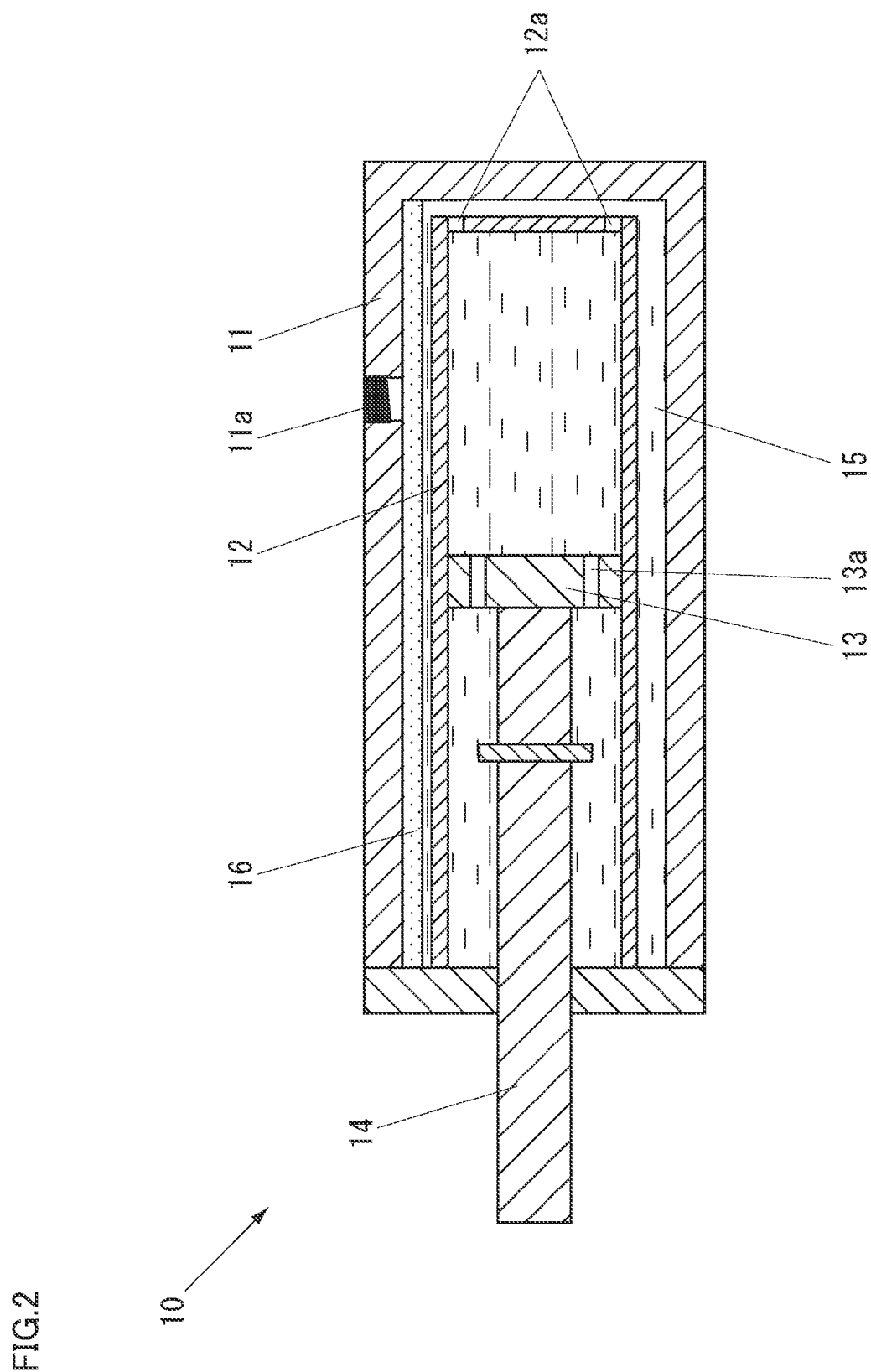
FIG. 2 is a cross-sectional view of the twin-tube shock absorber of FIG. 1 having an outer tube with a threaded hole.

FIG. 2 is a cross-sectional view of the twin-tube shock absorber 10 having the outer tube 11 with the threaded hole 11*a*.

As shown in FIG. 2, the twin-tube shock absorber 10 is fixed in a state of being laid down.

In the twin-tube shock absorber 10 in the state shown in FIG. 2, an upper portion of the side surface of the outer tube is drilled from the outside of the outer tube 11, and a hole is formed. A thread is formed in the hole by a tap to provide the threaded hole 11*a*. The position of the threaded hole 11*a* in the outer tube 11 is determined not to cause the check valve 20 to interfere with other members when the twin-tube shock absorber 10 is mounted in vehicles such as automobiles and motorcycles in a state that the check valve 20 (see, FIG. 3) is mounted in the threaded hole 11*a*.

When drilling from the outside of the outer tube 11, the drilling is performed while sucking the drilling chips with a vacuum cleaner so as to prevent the drilling chips from entering inside the outer tube 11.

<Oil Draining Step>

The oil 15 is drained from the inside of the twin-tube shock absorber 10 to the outside through the threaded hole 11*a*. The drained oil 15 is collected without spilling to be measured (drained oil measurement step).

When the oil 15 is drained, the twin-tube shock absorber 10 is tilted at various angles, and the piston rod 14 may be stroked in various patterns; however, the following methods are effectively used.

[Method 1]

Figure 4:
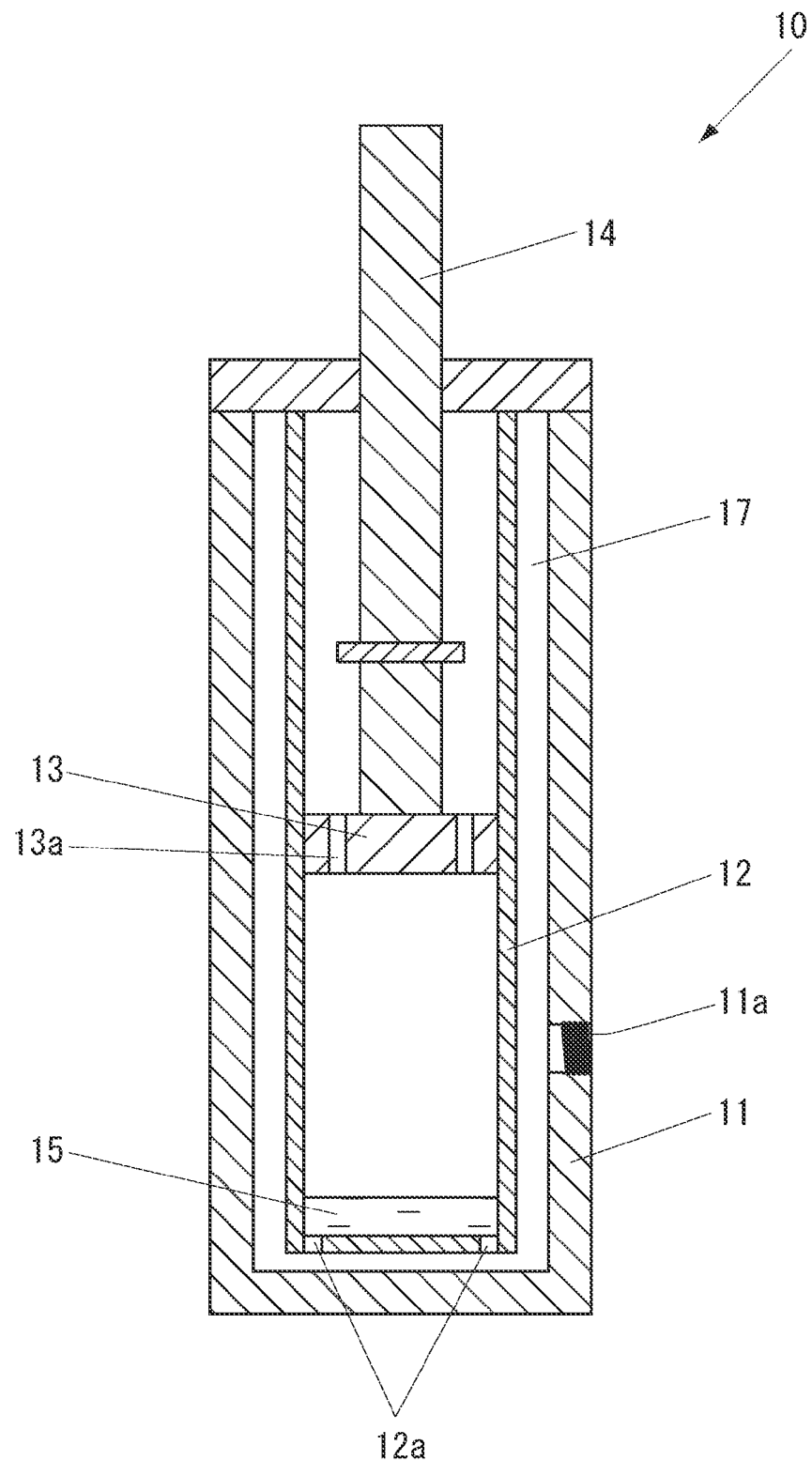
FIG. 4 is a cross-sectional view of the twin-tube shock absorber of FIG. 1 in a state that oil remains in an inner tube.
Figure 5:
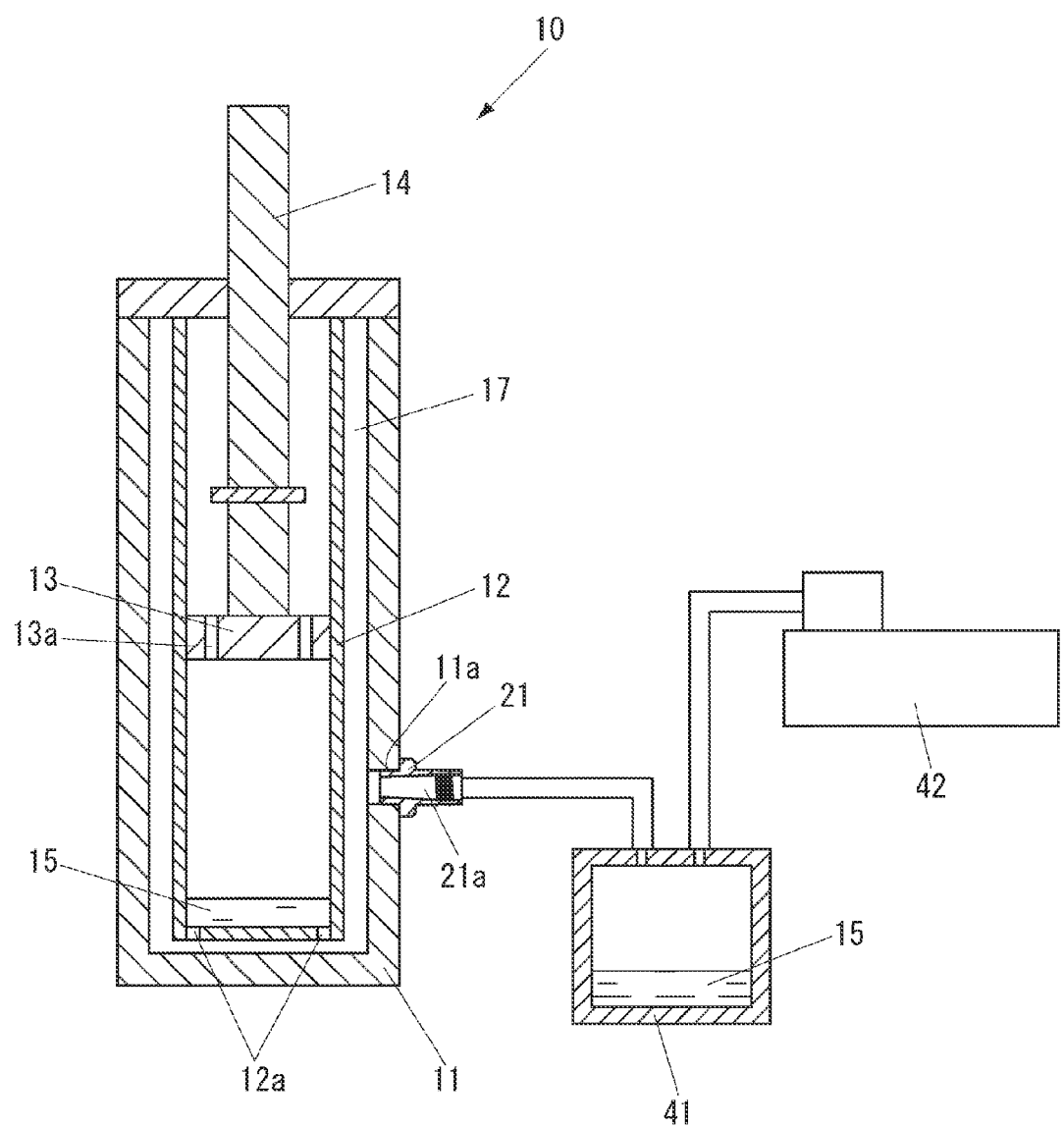
FIG. 5 is a configuration diagram of a system in which a vacuum pump is connected to the twin-tube shock absorber of FIG. 1 in the state that the oil remains in the inner tube.

FIG. 4 is a cross-sectional view of the twin-tube shock absorber 10 in a state that the oil 15 remains in the inner tube 12. FIG. 5 is a configuration diagram of a system in which a vacuum pump 42 is connected to the twin-tube shock absorber 10 in the state that the oil 15 remains in the inner tube 12.

As shown in FIG. 4, the twin-tube shock absorber 10 is fixed so that the piston rod 14 is positioned on the upper side in the twin-tube shock absorber 10.

A compressed gas (for example, a compressed air) is temporarily injected from the outside of the twin-tube shock absorber 10 to the inside through the threaded hole 11*a* (compressed gas injection step), and the compressed gas is discharged from the inside of the twin-tube shock absorber 10 to the outside through the threaded hole 11*a* (piston rod position upper side state compressed gas discharge step).

Since the atmospheric pressure between the outer tube 11 and the inner tube 12 is reduced by the discharge of the compressed gas from the inside of the twin-tube shock absorber 10 to the outside through the threaded hole 11*a*, the oil 15 remaining in the inner tube 12 can be sucked from the inside of the inner tube 12 to the outside through the base valve 12*a* of the bottom portion of the inner tube 12.

After the piston rod 14 is completely inserted, the threaded hole 11*a* is positioned on the lower side in the twin-tube shock absorber 10, and the oil 15 is drained from the inside of the twin-tube shock absorber 10 to the outside through the threaded hole 11*a*.

Instead of using the compressed gas, after execution of a valve case mounting step described later, as shown in FIG. 5, an oil separator 41 and the vacuum pump 42 are connected to the valve case 21, and the fluid, that is, the oil 15 and the air 17 are sucked out by the vacuum pump 42 from the inside of the twin-tube shock absorber 10 to the outside through a flow channel 21*a* formed in the valve case 21 in the threaded hole 11*a* (rod position upper side state fluid sucking step). According to this constitution, a similar result to the case of using the compressed gas can be obtained.

[Method 2]

Figure 6:
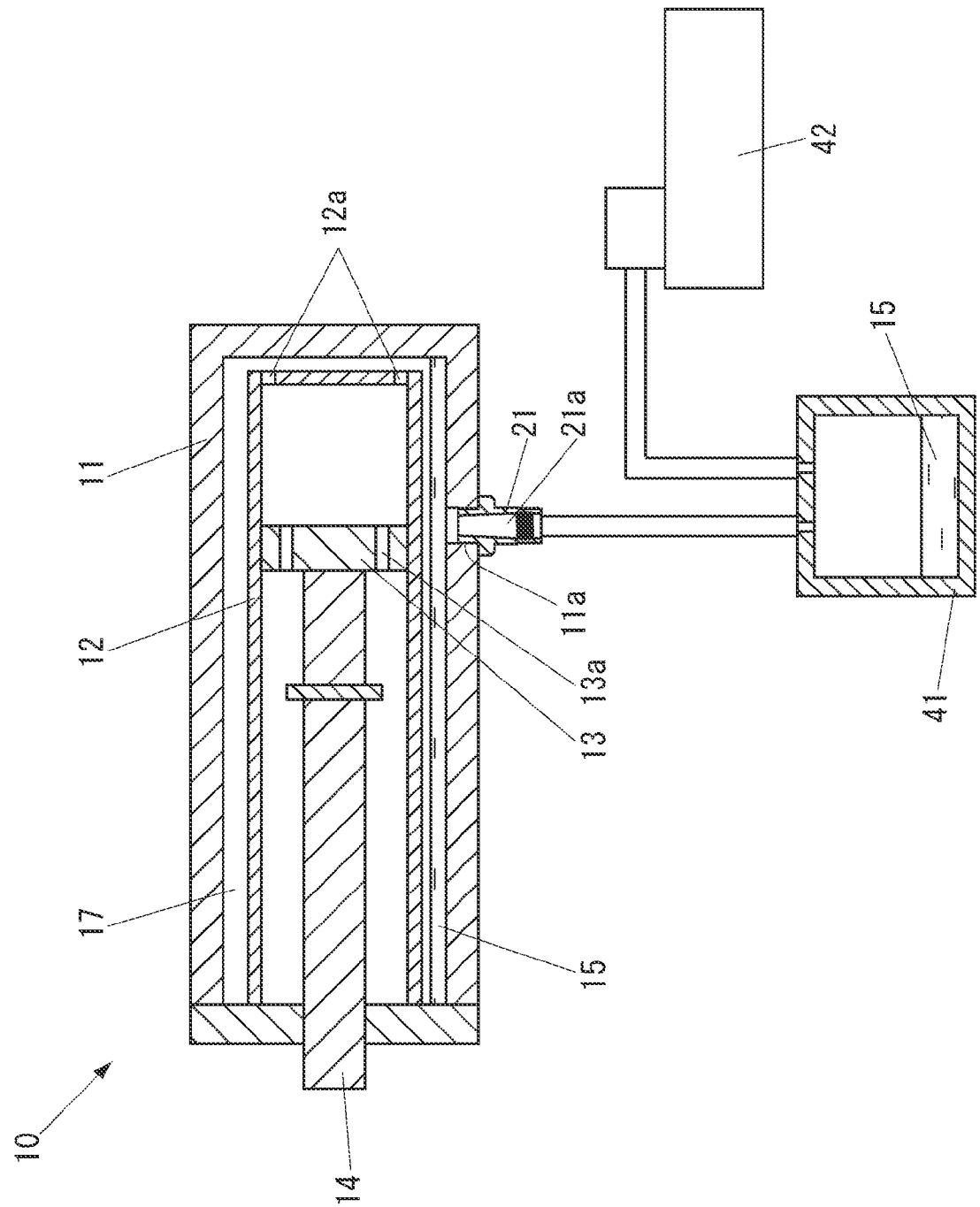
FIG. 6 is a configuration diagram of a system in which the vacuum pump is connected to the twin-tube shock absorber of FIG. 1 in the state that oil remains in an outer tube.

FIG. 6 is a configuration diagram of a system in which the vacuum pump 42 is connected to the twin-tube shock absorber 10 in the state that oil 15 remains in the outer tube 11.

After execution of the valve case mounting step described later, the piston rod 14 is completely inserted, and the twin-tube shock absorber 10 is fixed so that the threaded hole 11*a* is positioned on the lower side in the twin-tube shock absorber 10.

As shown in FIG. 6, the oil separator 41 and the vacuum pump 42 are connected to the valve case 21, and the fluid, that is, the oil 15 and the air 17 are sucked out by the vacuum pump 42 from the inside of the twin-tube shock absorber 10 to the outside through the flow channel 21*a* of the valve case 21 in the threaded hole 11*a* (hole position lower side state fluid sucking step).

Since the fluid is sucked from the inside of the twin-tube shock absorber 10 to the outside through the threaded hole 11*a* in a state that the threaded hole 11*a* is positioned on the lower side in the twin-tube shock absorber 10, the oil 15 remaining in the outer tube 11 can be drained from the inside of the outer tube 11 to the outside.

Instead of using the oil separator 41 and the vacuum pump 42, a compressed gas (for example, a compressed air) is temporarily injected from the outside of the twin-tube shock absorber 10 to the inside through the threaded hole 11*a* (compressed gas injection step), and the compressed gas is discharged from the inside of the twin-tube shock absorber 10 to the outside through the threaded hole 11*a* in a state that the threaded hole 11*a* is positioned on the lower side in the twin-tube shock absorber 10 (hole position lower side state compressed gas discharge step). According to this constitution, a similar result to the case of using the oil separator 41 and the vacuum pump 42 can be obtained.

<Valve Case Mounting Step>

Figure 7:
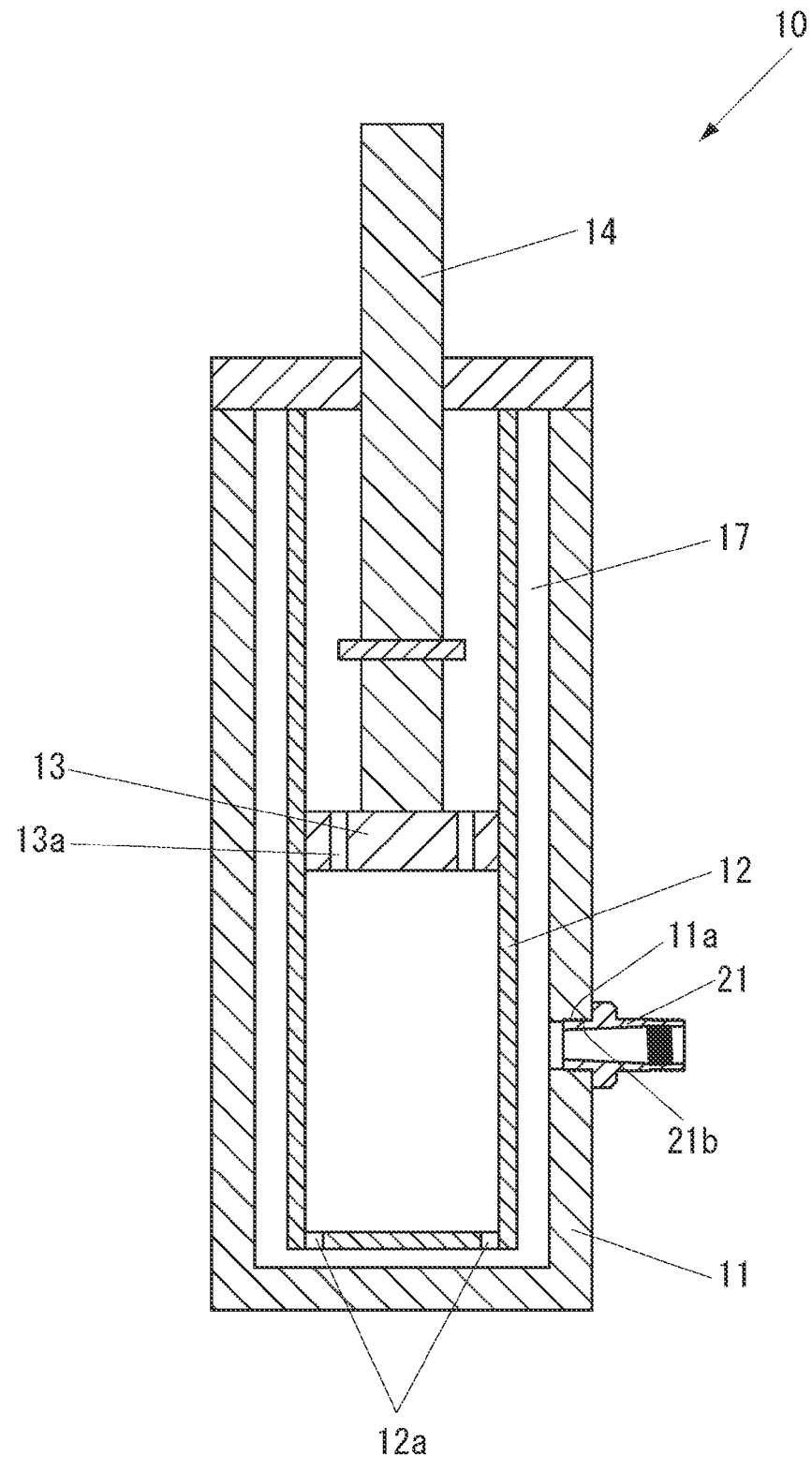
FIG. 7 is a cross-sectional view of the twin-tube shock absorber of FIG. 1 mounted with only a valve case of a check valve.

FIG. 7 is a cross-sectional view of the twin-tube shock absorber 10 mounted with the valve case 21.

A seal tape is wound around a threaded portion 21*b* formed outside of the valve case 21, and a sealant is further applied thereto in order to improve the durability. The threaded portion 21*b* is fitted into the threaded hole 11*a*, and the valve case 21 is mounted in the threaded hole 11*a* as shown in FIG. 7.

<Replacement Oil Charge Step>

Figure 8:
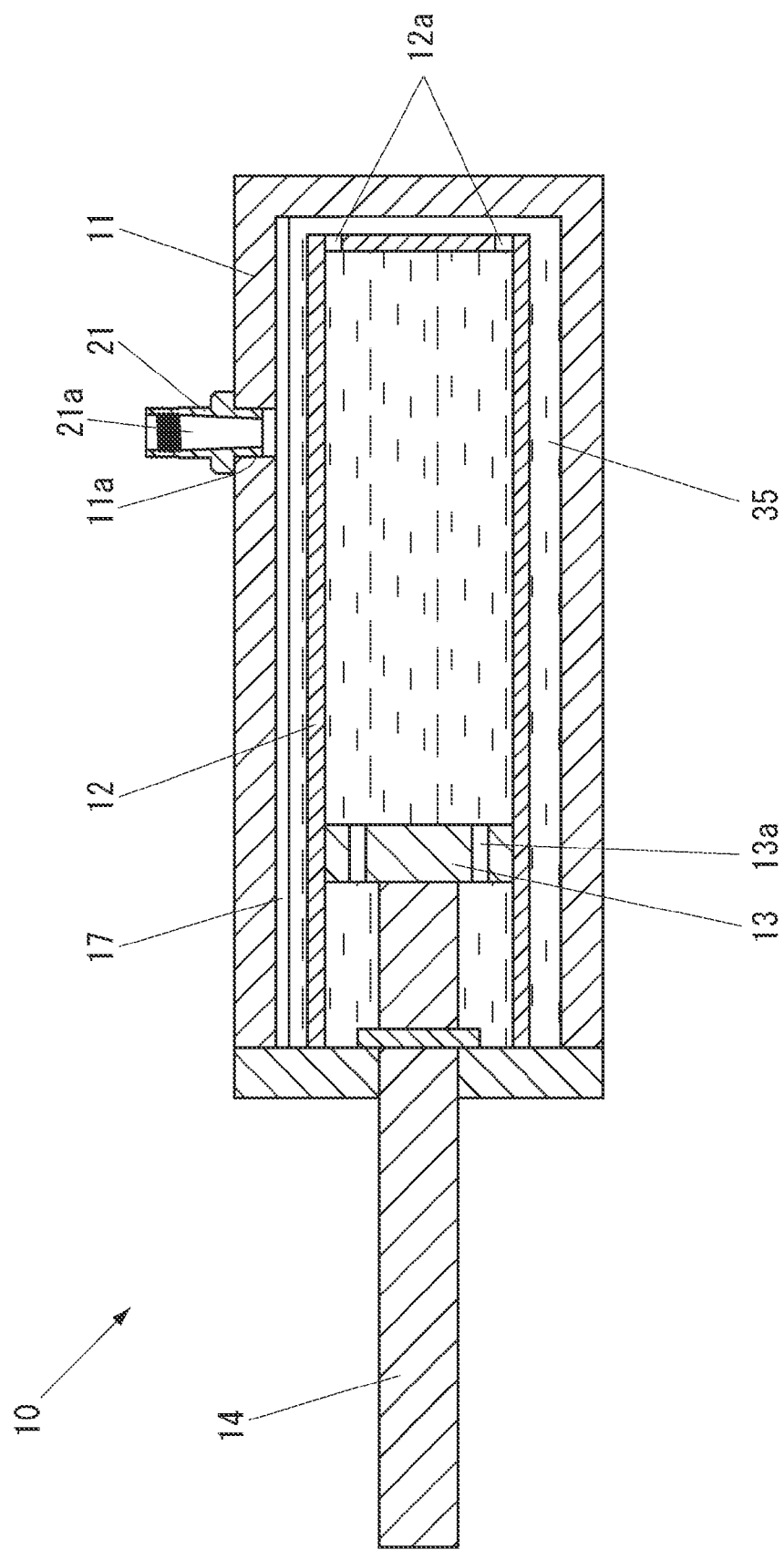
FIG. 8 is a cross-sectional view of the twin-tube shock absorber of FIG. 1 containing replacement oil.

FIG. 8 is a cross-sectional view of the twin-tube shock absorber 10 containing the replacement oil 35.

As shown in FIG. 8, the twin-tube shock absorber 10 is fixed so that the valve case 21 is positioned on the upper side in the twin-tube shock absorber 10.

Then, the replacement oil 35 is charged from the outside of the twin-tube shock absorber 10 to the inside through the flow channel 21a of the valve case 21 in the threaded hole 11a. At this time, when the piston rod 14 is inserted, the air 17 in the twin-tube shock absorber 10 is discharged from the inside of the twin-tube shock absorber 10 to the outside through the threaded hole 11a. Meanwhile, when the piston rod 14 is drawn out, the replacement oil 35 is sucked into the twin-tube shock absorber 10 from the outside of the twin-tube shock absorber 10 through the threaded hole 11a.

It is preferable that the amount of the replacement oil 35 is determined based on the amount of the oil 15 measured in the drained oil measurement step (see, FIG. 1), because the damping characteristics of the twin-tube shock absorber 10 can be easily changed to the desired damping characteristics. For example, the amount of the replacement oil 35 is adjusted in a range of about 10% to 20% increase/decrease in the amount of the oil 15 measured in the drained oil measurement step. As the amount of the replacement oil 35 becomes larger, the rate of volume change of the replacement nitrogen gas 36 when the piston rod 14 is inserted (see, FIG. 3) becomes larger, and therefore, the impact of full bump of the twin-tube shock absorber 10 can be reduced.

The replacement oil 35 may be different in viscosity from the oil 15 originally contained in the twin-tube shock absorber 10. For example, the replacement oil 35 may have a viscosity of about two to four times the viscosity of the oil 15, for example, a viscosity of about $3 \times 10^{-5}$ m$^2$/s to $8 \times 10^{-5}$ m$^2$/s.

Further, the replacement oil 35 preferably contains a rubber softener in amount of, for example about 5% to 10%. When the rubber softener is contained in the replacement oil 35, the replacement oil 35 can be prevented from leaking from the inside of the twin-tube shock absorber 10 to the outside through the rubber seal of the twin-tube shock absorber 10, for example the seal portion between the outer tube 11 and the piston rod 14.

<Check Valve Mounting Step>

Figure 9:
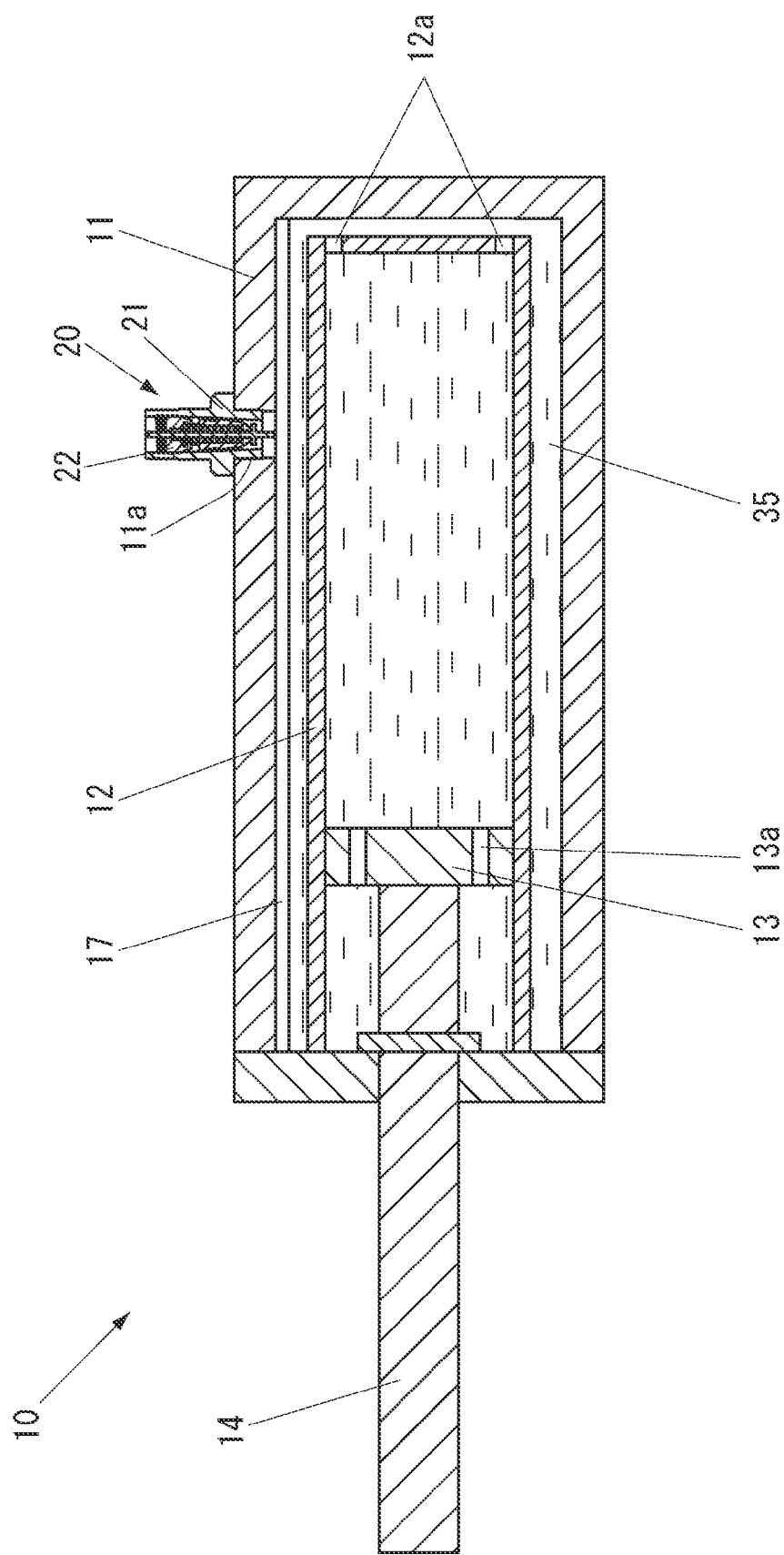
FIG. 9 is a cross-sectional view of the twin-tube shock absorber of FIG. 1 in a state that a piston rod is completely drawn out and the check valve is positioned on the upper side in the twin-tube shock absorber.
Figure 10:
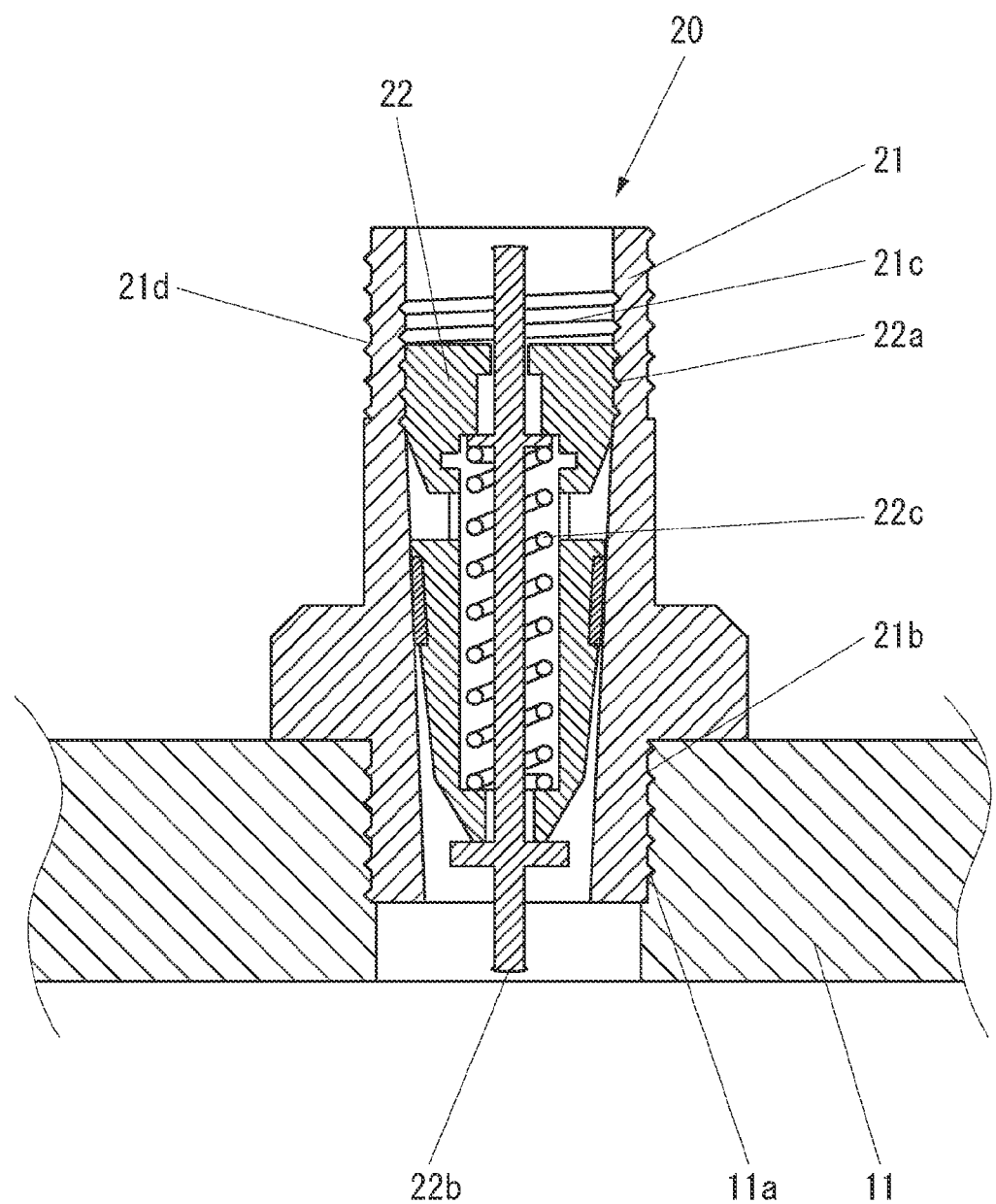
FIG. 10 is a cross-sectional view of the check valve in the state shown in FIG. 9.

FIG. 9 is a cross-sectional view of the twin-tube shock absorber 10 in a state that the piston rod 14 is completely drawn out, and the check valve 20 is positioned on the upper side in the twin-tube shock absorber 10. FIG. 10 is a cross-sectional view of the check valve 20 in the state shown in FIG. 9.

As shown in FIG. 8, the piston rod 14 is completely drawn out, the twin-tube shock absorber 10 is fixed so that the valve case 21 is positioned on the upper side in the twin-tube shock absorber 10.

Then, as shown in FIGS. 9 and 10, a valve core 22 is inserted in the valve case 21 so that the fluid can be prevented from outflowing from the inside of the twin-tube shock absorber to the outside through the threaded hole 11a, and a threaded portion 21c formed in the valve case 21 is engaged with a threaded portion 22a formed outside the valve core 22. Thus, the valve core 22 is mounted into the valve case 21, and the check valve 20 is completed. According to this constitution, the check valve 20 as an outflow prevention valve is duly mounted in the threaded hole 11a.

<Gas Sucking Step>

Figure 11:
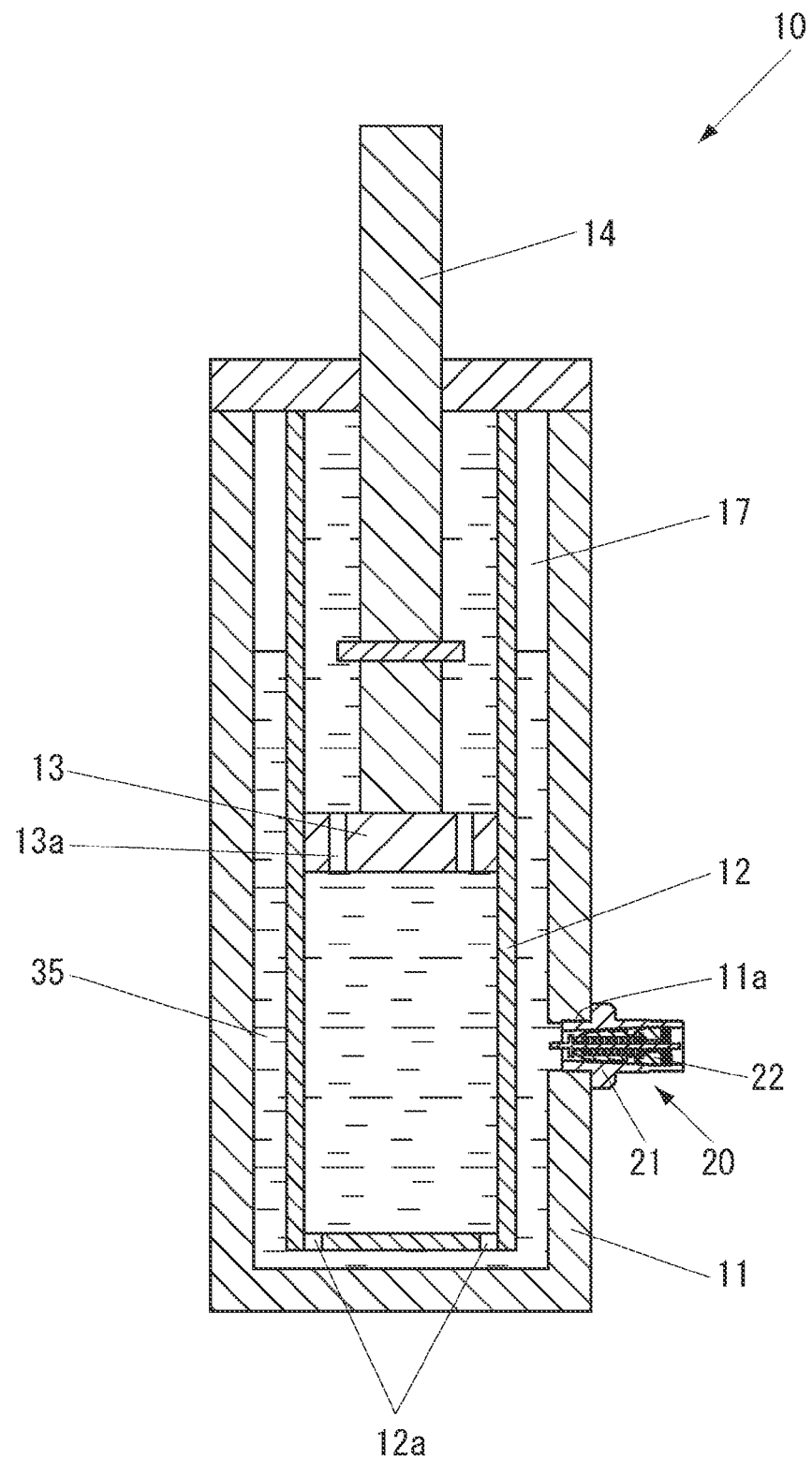
FIG. 11 is a cross-sectional view of the twin-tube shock absorber of FIG. 1 in a state that the piston rod is positioned on the upper side in the twin-tube shock absorber.
Figure 12:
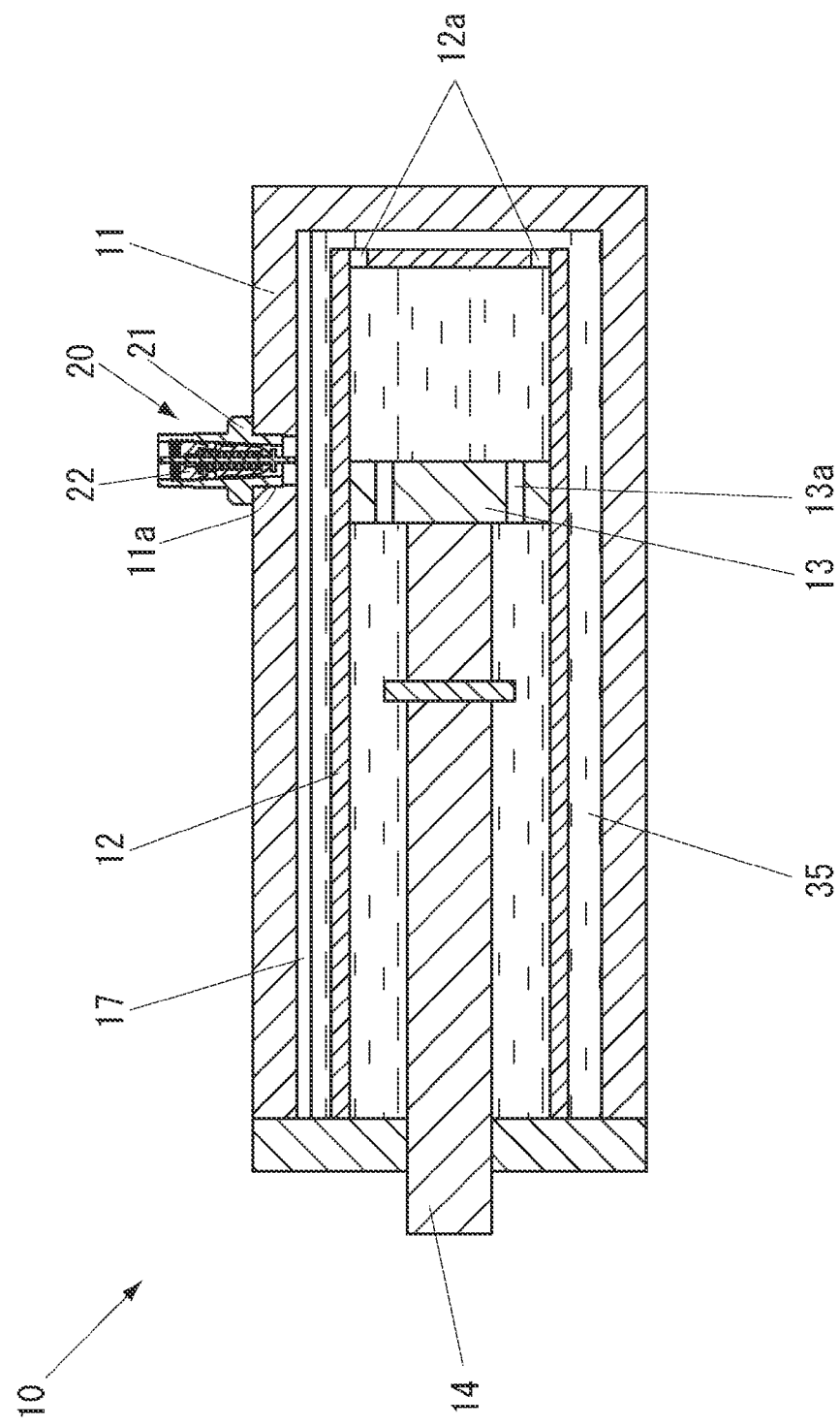
FIG. 12 is a cross-sectional view of the twin-tube shock absorber of FIG. 1 in a state that the piston rod is completely inserted and the check valve is positioned on the upper side in the twin-tube shock absorber.
Figure 13:
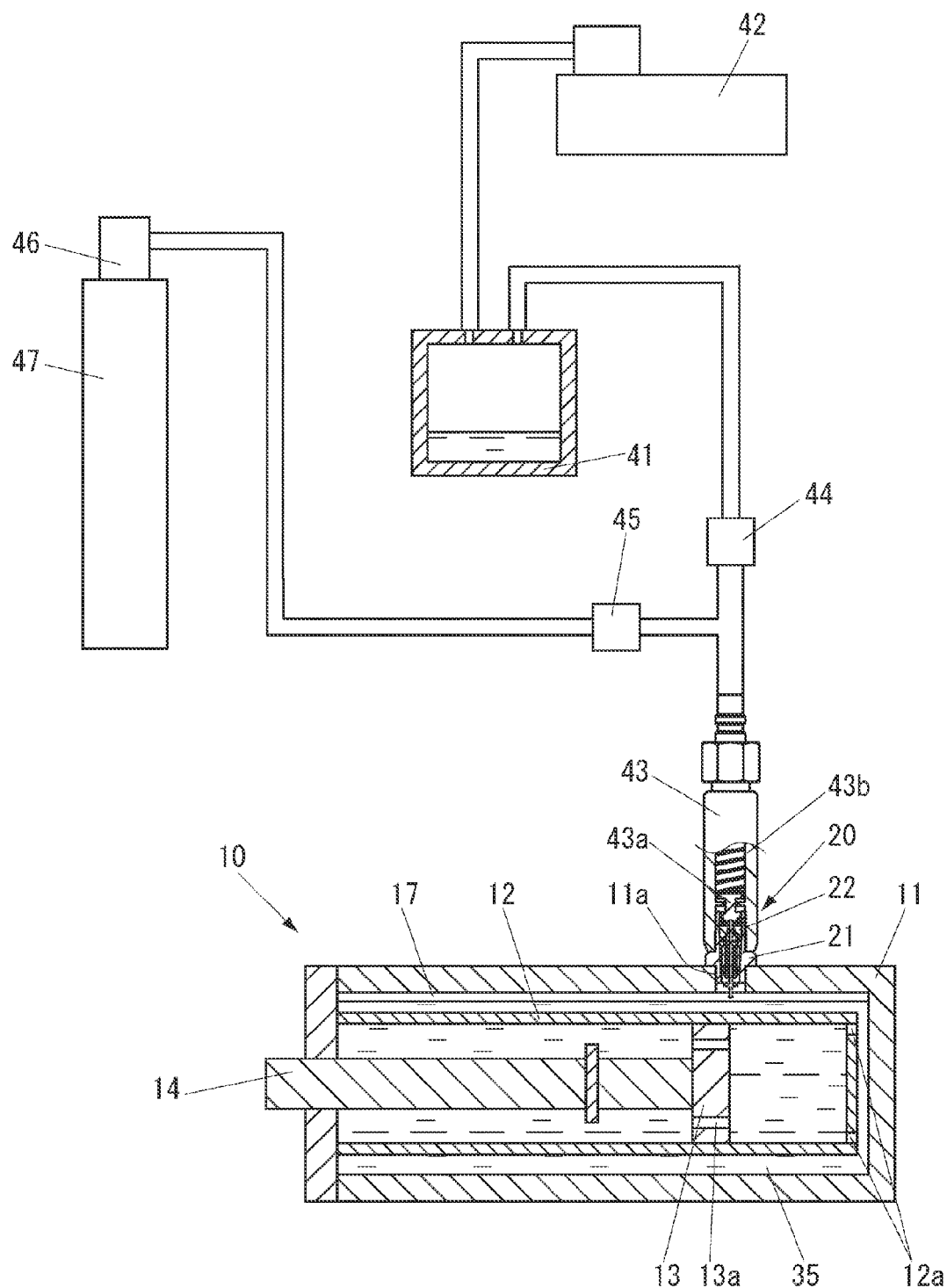
FIG. 13 is a configuration diagram in a gas sucking step of a system in which the vacuum pump and a gas cylinder are connected to the twin-tube shock absorber of FIG. 1.
Figure 14:
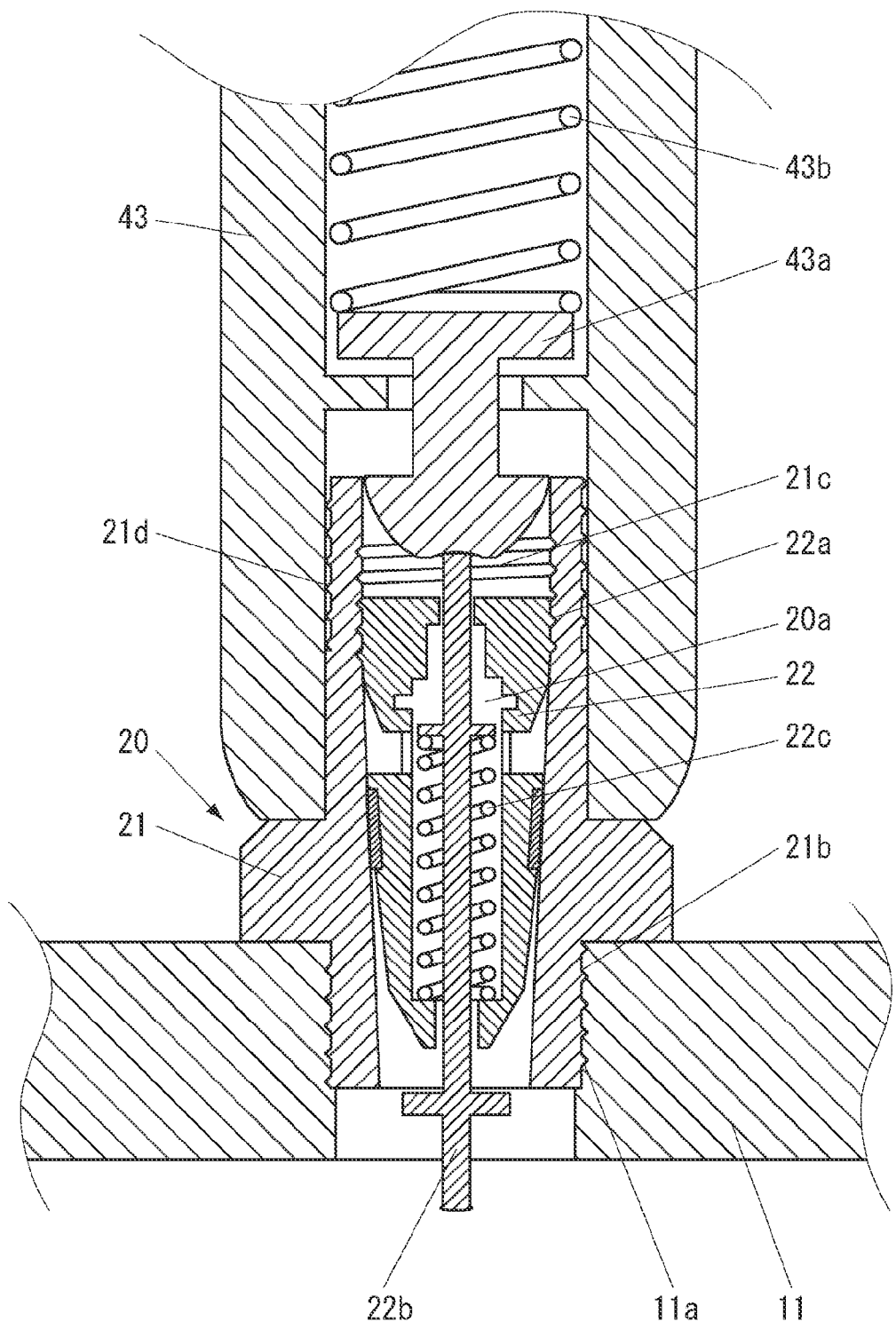
FIG. 14 is a cross-sectional view of the check valve in the state shown in FIG. 13.

FIG. 11 is a cross-sectional view of the twin-tube shock absorber 10 in a state that the piston rod 14 is positioned on the upper side in the twin-tube shock absorber 10. FIG. 12 is a cross-sectional view of the twin-tube shock absorber 10 in a state that the piston rod 14 is completely inserted and the check valve 20 is positioned on the upper side in the twin-tube shock absorber 10. FIG. 13 is a configuration diagram in a gas sucking step of a system in which the vacuum pump 42 and a gas cylinder 47 are connected to the twin-tube shock absorber 10. FIG. 14 is a cross-sectional view of the check valve 20 in the state shown in FIG. 13.

As shown in FIG. 11, the twin-tube shock absorber 10 is fixed so that the piston rod 14 is positioned on the upper side in the twin-tube shock absorber 10.

The piston rod 14 is repeatedly stroked until the stroke pressure of the piston rod 14 is stabilized.

As shown in FIG. 12, the piston rod 14 is completely inserted, and the twin-tube shock absorber 10 is fixed so that the check valve 20 is positioned on the upper side in the twin-tube shock absorber 10.

Next, as shown in FIGS. 13 and 14, the check valve 20 is fitted into a gas nozzle 43. Thereby, a rod 22b of the valve core 22 is pushed by a rod 43a in the gas nozzle 43 to move against the urging force of a spring 22c, and the check valve 20 is temporarily opened. Meanwhile, the rod 43a of the gas nozzle 43 is pushed by the rod 22b of the check valve 20 to move against the urging force of a spring 43b, and the gas nozzle 43 is temporarily opened.

Thus, the twin-tube shock absorber 10 is connected to the oil separator 41 and the vacuum pump 42 through a stop valve 44, and, at the same time, is connected to a regulator 46 and the gas cylinder 47 through a stop valve 45. At this time, the stop valves 44 and 45 are opened.

After the gas (the air 17) is completely sucked by the vacuum pump 42 from the inside of the twin-tube shock absorber 10 to the outside through a flow channel 20a of the temporarily opened check valve 20, the stop valve 44 is closed.

<Replacement Gas Injection Step>

The replacement gas injection step is performed subsequent to the gas sucking step.

Figure 3:
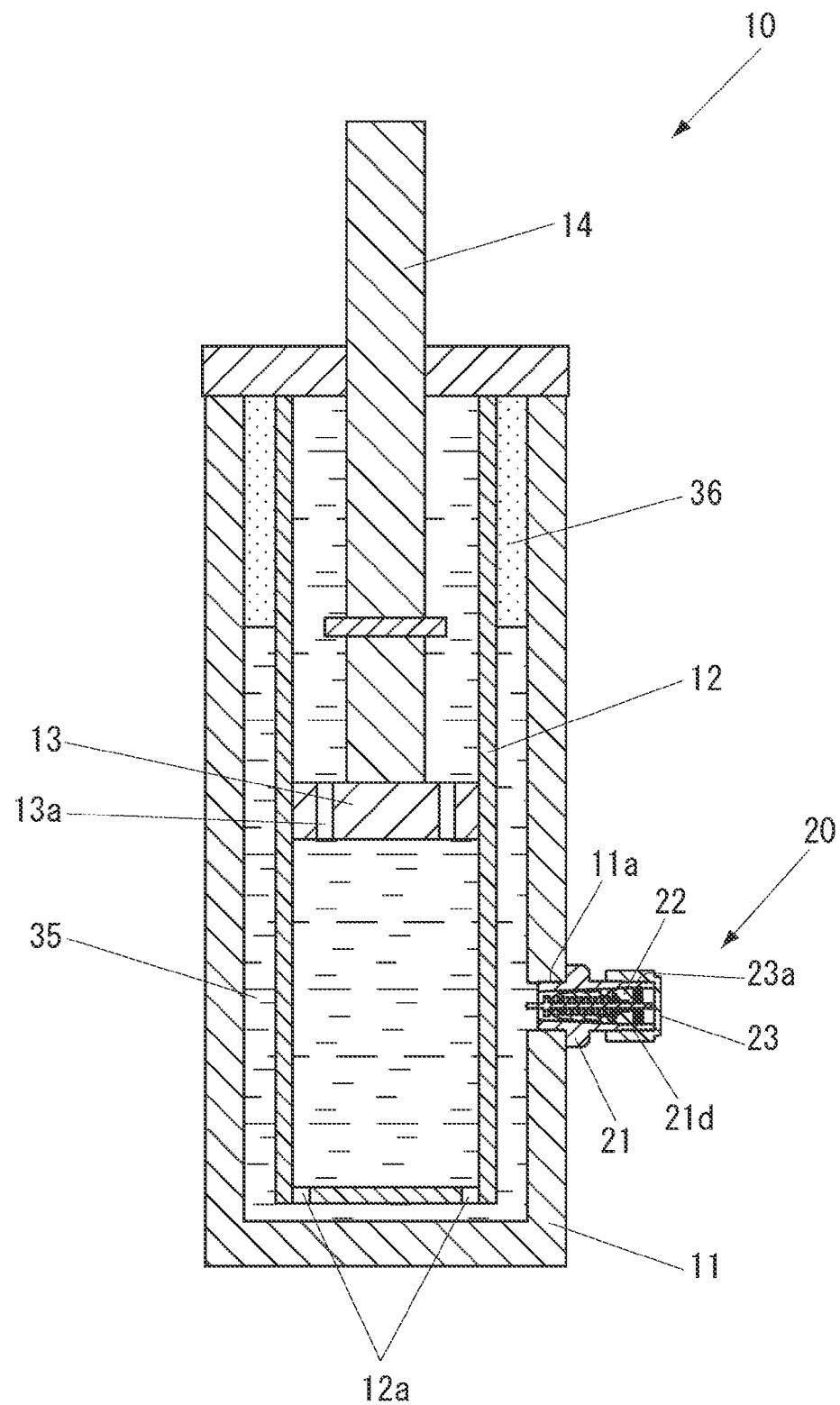
FIG. 3 is a cross-sectional view of the twin-tube shock absorber of FIG. 1 after application of the method of changing the damping characteristics of a twin-tube shock absorber according to the embodiment of the invention.
Figure 15:
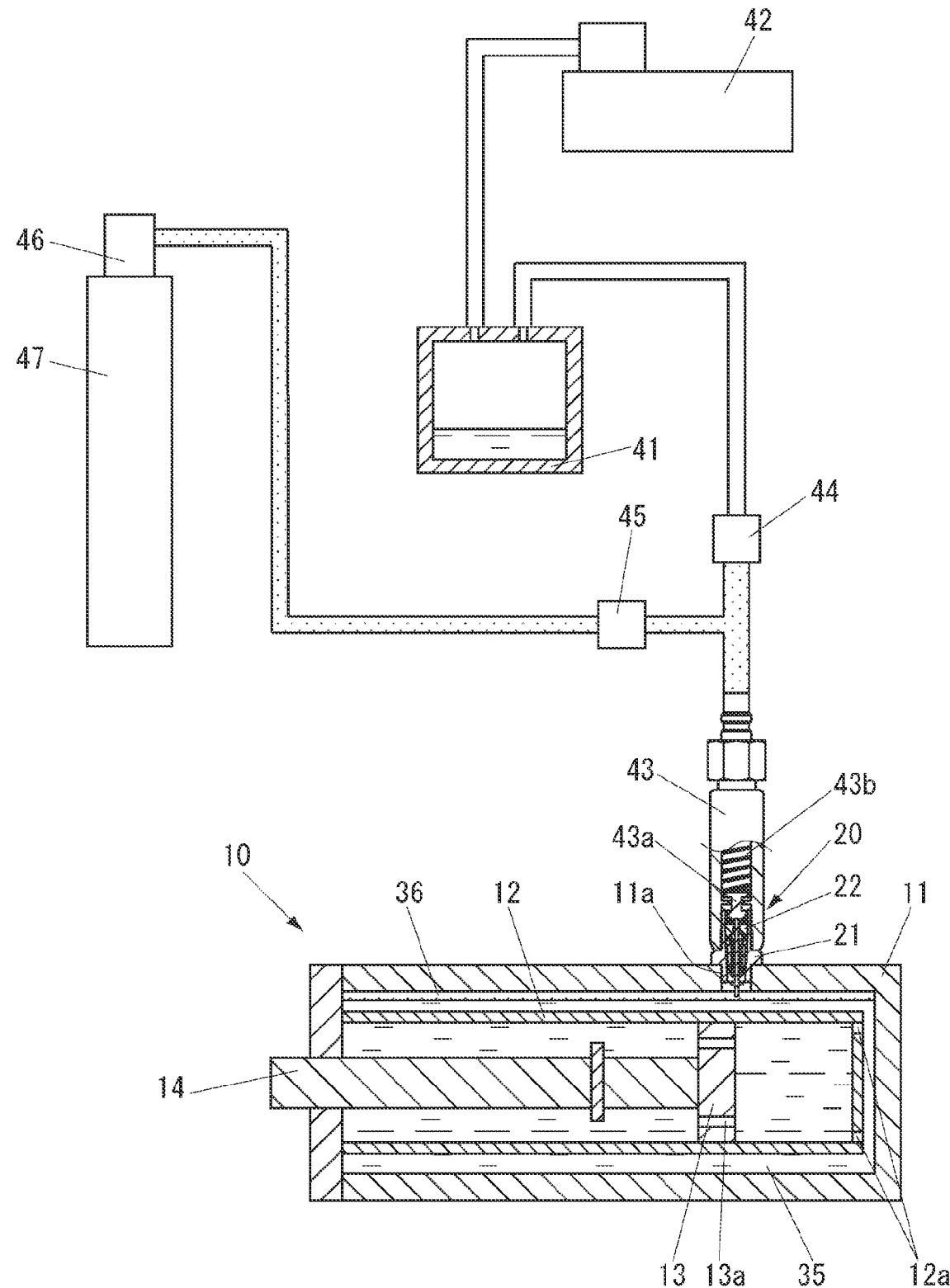
FIG. 15 is a configuration diagram in a replacement gas injection step of the system in which the vacuum pump and the gas cylinder are connected to the twin-tube shock absorber of FIG. 1.

FIG. 3 is a cross-sectional view of the twin-tube shock absorber 10 after application of the damping characteristics changing method according to the embodiment. FIG. 15 is a configuration diagram in the replacement gas injection step of the system in which the vacuum pump 42 and the gas cylinder 47 are connected to the twin-tube shock absorber 10.

As shown in FIG. 15, a main cock of the gas cylinder 47 is opened until the pressure of the nitrogen gas 36 between the regulator 46 and the twin-tube shock absorber 10 reaches the target pressure. Thus, the replacement gas (the nitrogen gas 36) is injected from the outside of the twin-tube shock absorber to the inside through the flow channel 20a of the temporarily opened check valve 20 (see, FIG. 14), and the twin-tube shock absorber 10 is filled at the target pressure.

The gas nozzle 43 is quickly removed from the check valve 20 so as to prevent the nitrogen gas 36 from leaking from the inside of the twin-tube shock absorber 10 to the outside through the check valve 20. The rod 22b (see, FIG. 14) of the valve core 22 moves against the urging force of the spring 22c (see, FIG. 14), and the check valve 20 is closed. Meanwhile, the rod 43a is moved against the urging force of the spring 43b, and the gas nozzle 43 is closed.

Finally, as shown in FIG. 3, the threaded portion 21d formed outside the valve case 21 of the check valve 20 and a threaded portion 23a formed inside a cap 23 for protecting the check valve 20 are engaged with each other, thereby the check valve 20 is covered by the cap 23.

<Completion Inspection Step>

As shown in FIG. 3, the twin-tube shock absorber 10 is fixed so that the piston rod 14 is positioned on the upper side in the twin-tube shock absorber 10.

The piston rod 14 is repeatedly stroked until the stroke pressure of the piston rod 14 is stabilized.

When there is no leak of the oil 35 or the nitrogen gas 36, the twin-tube shock absorber 10 to which the damping characteristics changing method is applied is completed.

As described above, in the damping characteristics changing method according to the present embodiment, by adjusting at least one of the kind of the replacement oil 35 charged from the outside of the twin-tube shock absorber 10 to the inside, the amount of the replacement oil 35, the kind of the replacement nitrogen gas 36 injected from the outside of the twin-tube shock absorber 10 to the inside, and the amount of the replacement nitrogen gas 36, the damping characteristics of the twin-tube shock absorber 10 can be changed to the desired damping characteristics.

When the damping characteristics of the twin-tube shock absorber 10 do not satisfy the conditions of use, the damping characteristics of the twin-tube shock absorber 10 can be changed according to the conditions of use. Since the twin-tube shock absorber 10 itself is not required to be replaced, waste can be reduced.

Even when the twin-tube shock absorber 10 is not a gas-filled twin-tube shock absorber, the twin-tube shock absorber 10 can be changed to the gas-filled twin-tube shock absorber.

In the present embodiment, the check valve mounting step is performed after the replacement oil charge step; however, according to the present invention, the check valve mounting step may be performed at any time as long as it is performed after the hole formation step and before the gas sucking step. For example, the check valve mounting step may be performed before the oil draining step. In this case, in the oil draining step, the oil 15 may be drained from the inside of the twin-tube shock absorber 10 to the outside through the flow channel 20a of the temporarily opened check valve 20 in the threaded hole 11a. Further, in the replacement oil charge step, the replacement oil 35 may be charged from the outside of the twin-tube shock absorber 10 to the inside through the flow channel 20a of the temporarily opened check valve 20 in the threaded hole 11a.

The invention claimed is:

1. A method of changing damping characteristics of a twin-tube shock absorber, comprising:
   a hole formation step of forming a hole in an outer tube of the twin-tube shock absorber;
   an oil draining step of draining oil from the inside of the twin-tube shock absorber to the outside through the hole, the oil draining step being performed after the hole formation step;
   an outflow prevention valve mounting step of mounting in the hole an outflow prevention valve for preventing a fluid from outflowing from the inside of the twin-tube shock absorber to the outside through the hole, the outflow prevention valve mounting step being performed after the hole formation step;
   a replacement oil charge step of charging replacement oil from the outside of the twin-tube shock absorber to the inside through the hole, the replacement oil charge step being performed after the oil draining step;
   a gas sucking step of sucking a gas from the inside of the twin-tube shock absorber to the outside through a flow channel of the temporarily opened outflow prevention valve in a state that the outflow prevention valve is positioned on the upper side in the twin-tube shock absorber, the gas sucking step being performed after the replacement oil charge step and the outflow prevention valve mounting step; and
   a replacement gas injection step of injecting a replacement gas from the outside of the twin-tube shock absorber to the inside through the flow channel of the temporarily opened outflow prevention valve in a state that the outflow prevention valve is positioned on the upper side in the twin-tube shock absorber, the replacement gas injection step being performed after the gas sucking step.

2. The method of changing damping characteristics of a twin-tube shock absorber according to claim 1, wherein the oil draining step comprises:
   a compressed gas injection step of injecting a compressed gas from the outside of the twin-tube shock absorber to the inside through the hole; and
   a piston rod position upper side state compressed gas discharge step of discharging the compressed gas from the inside of the twin-tube shock absorber to the outside through the hole in a state that the piston rod is positioned on the upper side in the twin-tube shock absorber, the piston rod position upper side state compressed gas discharge step being performed after the compressed gas injection step.

3. The method of changing damping characteristics of a twin-tube shock absorber according to claim 1, wherein the oil draining step comprises a rod position upper side state fluid sucking step of sucking the fluid from the inside of the twin-tube shock absorber to the outside through the hole in a state that the piston rod is positioned on the upper side in the twin-tube shock absorber.

4. The method of changing damping characteristics of a twin-tube shock absorber according to claim 1, wherein the oil draining step comprises a hole position lower side state fluid sucking step of sucking the fluid from the inside of the twin-tube shock absorber to the outside through the hole in a state that the hole is positioned on the lower side in the twin-tube shock absorber.

5. The method of changing damping characteristics of a twin-tube shock absorber according to claim 1, wherein the oil draining step comprises:
   a compressed gas injection step of injecting a compressed gas from the outside of the twin-tube shock absorber to the inside through the hole; and
   a hole position lower side state compressed gas discharge step of discharging the compressed gas from the inside of the twin-tube shock absorber to the outside through the hole in a state that the hole is positioned on the lower side in the twin-tube shock absorber, the hole position lower side state compressed gas discharge step being performed after the compressed gas injection step.

6. The method of changing damping characteristics of a twin-tube shock absorber according to claim 1, further comprising a drained oil measurement step of measuring the amount of the oil drained from the inside of the twin-tube shock absorber to the outside in the oil draining step,
   wherein the amount of the replacement oil charged from the outside of the twin-tube shock absorber to the inside in the replacement oil charge step is determined based on the amount of the oil measured in the drained oil measurement step.

7. The method of changing damping characteristics of a twin-tube shock absorber according to claim 1, wherein the replacement oil contains a rubber softener.

* * * * *